UNITED STATES PATENT OFFICE.

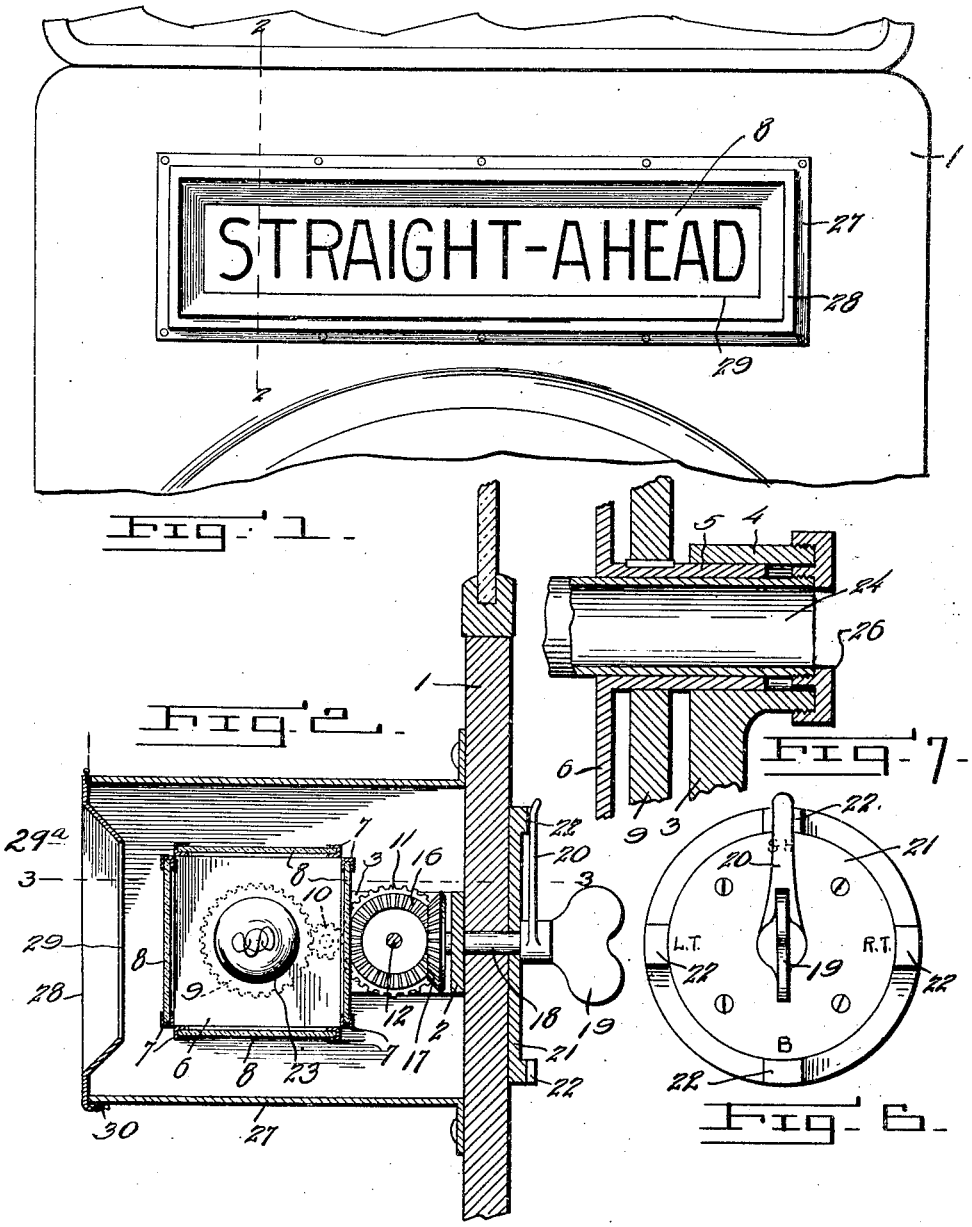

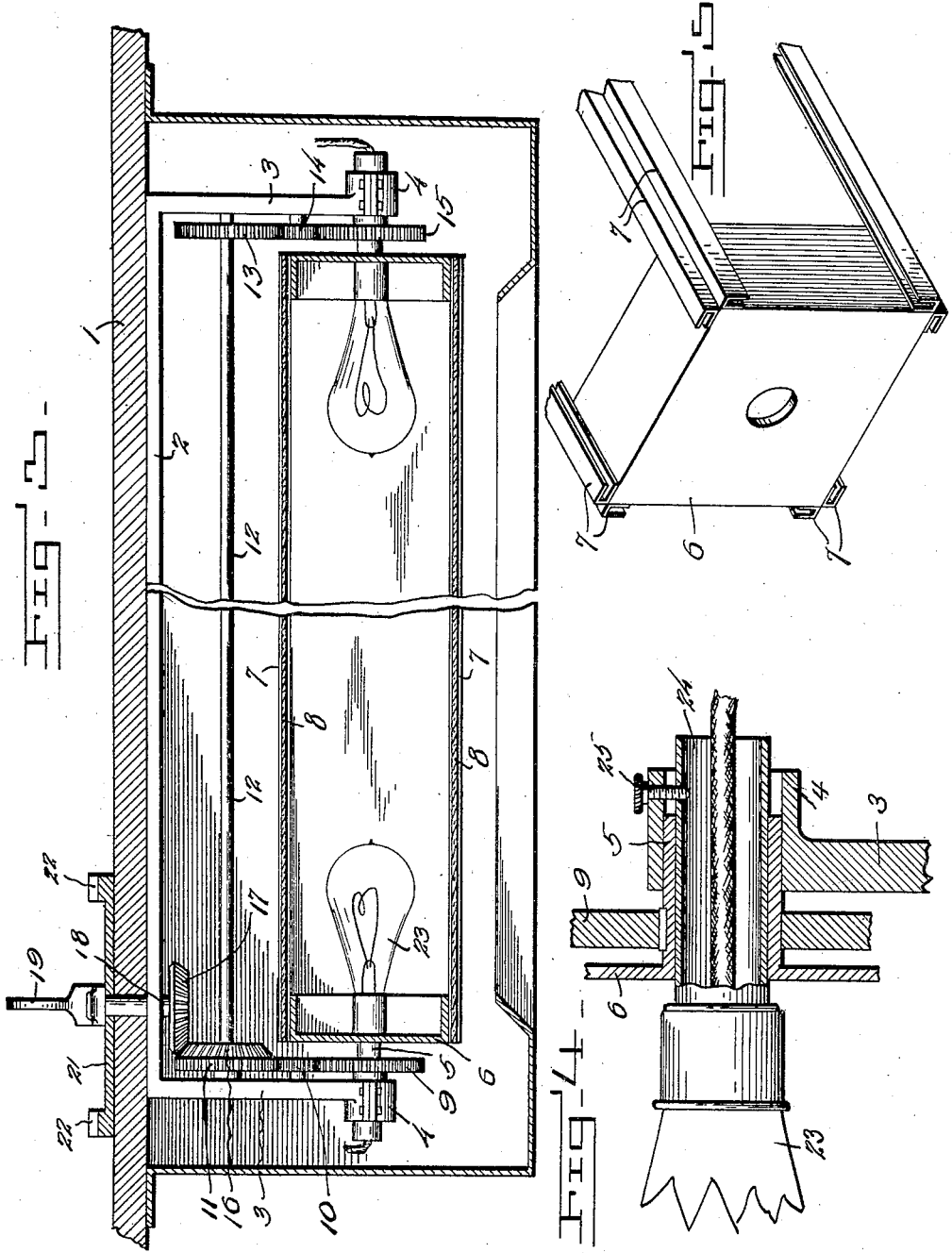

JESSE G. ROSEBOOM, OF SHELBYVILLE, INDIANA.

SIGNAL FOR MOTOR-VEHICLES AND THE LIKE.

1,325,171.            Specification of Letters Patent.      Patented Dec. 16, 1919.

Application filed October 25, 1916. Serial No. 127,679.

*To all whom it may concern:*

Be it known that I, JESSE G. ROSEBOOM, a citizen of the United States, residing at Shelbyville, in the county of Shelby and State of Indiana, have invented new and useful Improvements in Signals for Motor-Vehicles and the like, of which the following is a specification.

My present invention pertains to signals for automobiles and other vehicles, and it consists in the peculiar and advantageous signal, hereinafter described and claimed, through the medium of which a driver may conveniently signal the course he purposes taking as he approaches a turn.

In the accompanying drawings which are hereby made a part hereof:

Figure 1, is a front elevation showing the arrangement of my signal apparatus relative to the dash board of an automobile.

Fig. 2 is an enlarged vertical section taken in the plane indicated by the line 2—2 of Fig. 1.

Fig. 3 is a section taken horizontally through the dash board and the signal apparatus.

Fig. 4 shows in detail the manner of mounting the end of the revoluble sign and the arrangement of incandescent electric lights therein.

Fig. 5 is a detail section showing one end of the sign frame.

Fig. 6 shows in elevation the handle by which the sign is turned, and the dial with which the pointer on the handle coöperates.

Fig. 7 is a detail section of a modification hereinafter specifically referred to.

Referring by numeral to said drawings and particularly to Figs. 1 to 6, thereof:

1 is the dash board of an automobile, and 2 is a bar fixed to the forward side of said dash board and provided with forwardly reaching arms 3 on which are bearings 4 to receive tubular trunnions 5 at the ends of the frame of the revoluble sign, shown in Figs. 2, 3 and 5. The sign frame comprises heads 6, and longitudinal bars 7. The said bars 7 are of U-shape in cross-section and are fixed to the sides of the heads 6, and it will be noticed by reference to Fig. 5, that the bars 7 are open at their ends, and that two of the bars are disposed in opposed relation on each of the four sides of the heads 6. The said bars 7 are designed to receive and hold panels 8, three of which are transparent, while the remaining panel which is preferably neutral may be transparent or opaque in the discretion of the manufacturer. Each of the transparent panels is designed to bear a sign, the panel shown in Fig. 1 having the inscription "Straight ahead", while the remaining transparent panels are preferably provided with the inscriptions "Right turn" and "Left turn", respectively.

I prefer to illuminate the revoluble sign with incandescent electric lamps 23, and each of these is preferably carried by a tube 24 which is extended through the adjacent tubular trunnion 5, and is connected to the adjacent bearing 4 by a set screw 25, and is designed for the passage of the electric wires complementary to the lamp. By reference to Fig. 4 it will be observed that the trunnions 5 are adapted to turn about the tubes 24 without rotation of the said tubes, the lamps or the lamp wires.

The revoluble sign and the appurtenances thereof thus far described are contained in a casing 27 that is attached to the front of the dash board 1 and is provided at 28 with a door having an opening 29 for the display of the inscription on the foremost panel 8 and also having said opening surrounded by a series of side reflectors 29ª. The said door 28 is hinged at its upper edge and is designed to be detachably fastened in a closed position as indicated by 30.

Fixed on the trunnions 5 of the revoluble sign are spur gears 9 and 15 with which are intermeshed pinions 10 and 14, respectively, and intermeshed with said pinions 10 and 14 are spur gears 11 and 13, respectively, which are carried by and fixed on a shaft 12. Also fixed on said shaft 12 is a beveled gear 16 with which is intermeshed a beveled gear 17, carried at the forward end of the shaft 18 of the handle 19. The said shaft 18 is journaled in the frame bar 2 and the dash board 1 so that the handle 19 is disposed at the rear of said board within convenient reach of the automobile driver for manipulation of the revoluble sign according to the direction he purposes taking at a turn. Fixed with respect to the handle 19 is a pointer 20, designed to coöperate with a dial 21 having equi-distant seats 22 for the reception of the pointer; the scheme being for the pointer to be disposed in one seat 22 when the "straight ahead" panel is displayed, in another seat 22, when the "right turn" panel is displayed, in another seat 22, when the "left turn" panel is displayed, and in the remaining seat 22, when the "neutral" panel is displayed. Thus from his position in the driver's seat the driver is enabled to conveniently and accurately position the revoluble sign for the display of the appropriate inscription.

The seats 22 referred to are shallow, and the pointer 20 is adapted to be sprung into and out of said seats when the handle 19 is turned.

In Fig. 7 I have illustrated a modified means of securing the tube 24, which may be a gas tube or the tube of an incandescent lamp, in position. In said modification the outer end of the tube 24 is exteriorly threaded, and an annulus 26 is provided with two interiorly threaded flanges, one to engage a thread on the bearing 4, and the other to engage a thread on the tube 24. In this way it is manifest that the tube 24 is so secured in position that there is no interference with the rotation of the sign trunnion 5 about the tube. I would also have it understood that when it is desired to introduce gas into the revoluble sign at one end only, the gas pipe at the opposite end thereof, may be connected to an imperforated element otherwise like the annulus 26 in the respect of having threaded flanges to engage the tube ends and the thread on the bearing 4, respectively.

It will be gathered from the foregoing that by virtue of my novel apparatus, the operator of a moving vehicle is enabled to apprise other persons of the direction the operator intends to take, particularly at a corner, with the result that the liability of accident is reduced to a minimum.

Having described my invention, what I claim and desire to secure by Letters Patent, is:

An automobile signal of the character described, comprising a dash-board, a signal frame secured to said dash-board, a horizontal bar fixedly secured to the outer wall of said board provided with an integral forwardly extended arm at each end thereof terminating in a bearing portion, a tubular trunnion mounted in each bearing portion adapted to support the signal frame, a spur gear mounted on each trunnion, a longitudinal shaft mounted intermediate the length of said extended arms with a spur gear mounted at one end thereof and a combined spur and bevel gear at its other end portion, an intermediate gear mounted on each of said arms adapted to mesh with the spur gears on the trunnions and the spur gear carried by said shaft, and a shaft journaled in said bar at right angles to the signal frame provided with a bevel gear at its outer end adapted to mesh with the bevel gear mounted on said horizontal shaft, and means carried by the inner end of the last named shaft whereby the signal frame may be properly operated.

In testimony whereof I have hereunto set my hand in presence of two subscribing witnesses.

JESSE G. ROSEBOOM.

Witnesses:
J. A. FLOYD,
ATWOOD MARTZ.